Oct. 8, 1957
W. R. ROWBOTHAM
2,808,695
HARVESTER REEL SUPPORT
Filed April 5, 1957
2 Sheets-Sheet 1
FIG. 1
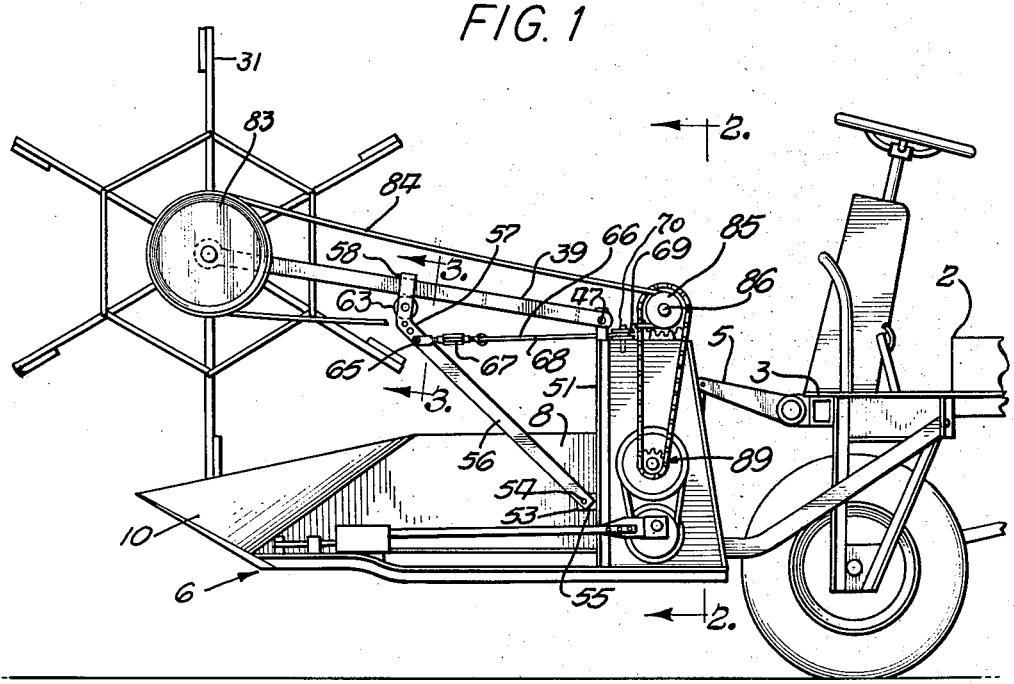
FIG. 2
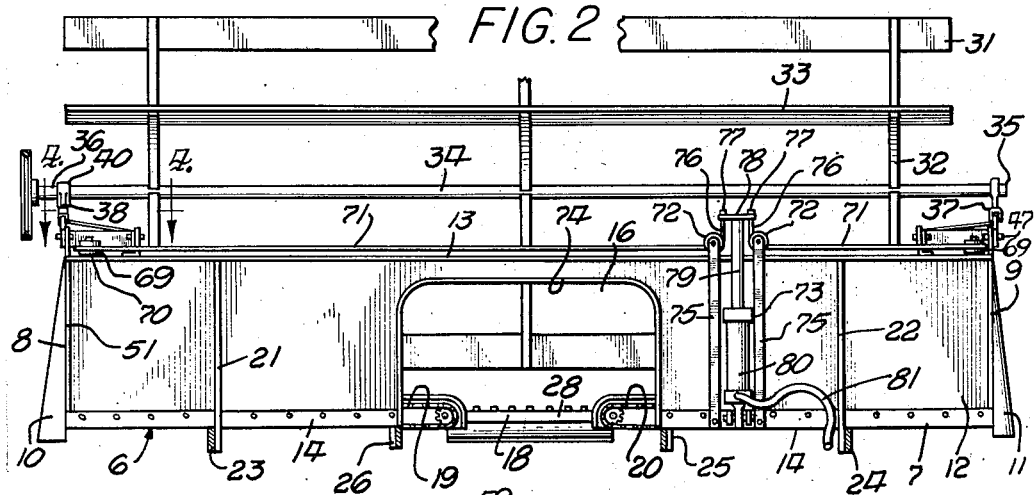
FIG. 4
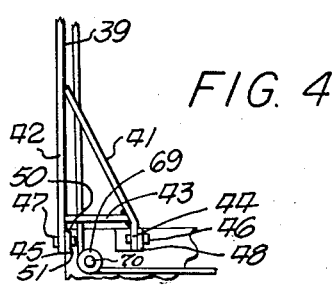
FIG. 3
INVENTOR
WILLIAM R. ROWBOTHAM
Paul O. Pippel
ATTORNEY

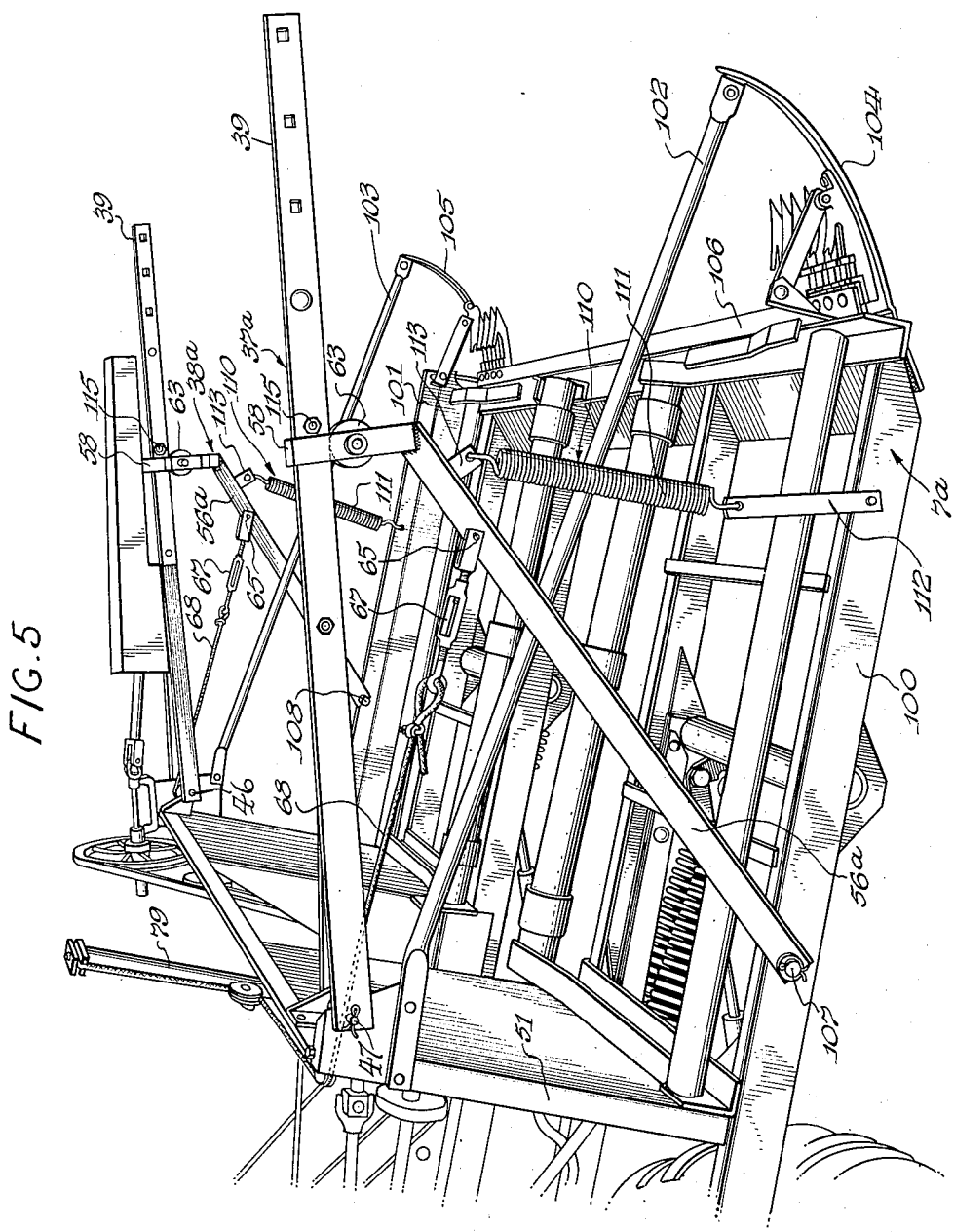

United States Patent Office 2,808,695
Patented Oct. 8, 1957

2,808,695

HARVESTER REEL SUPPORT

William R. Rowbotham, Hamilton, Ontario, Canada, assignor to International Harvester Company, Chicago, Ill., a corporation of New Jersey Application April 5, 1957, Serial No. 651,107

10 Claims. (Cl. 56—221)

This invention relates to harvesting machines and more specifically to a novel support for the harvesting reel. This application is a continuation in part of my U. S. application 494,419, filed March 15, 1955, for Reel Support, and now abandoned.

A general object of the invention is to provide a simple linkage which as adaptable to support a reel of great length and which is of simple, efficient and rugged construction.

A general object of the invention is to provide a support for a reel which is actuated by means of a hydraulic system from a single hydraulic motor.

A further object of the invention is to provide a support for each end of the reel of the type which comprises a fore and aft extending arm for each end of the reel, each arm having a forward end which is connected to the adjacent end of the shaft of the reel and having a rear end which is pivoted to the upper end of an upright beam member, the arm and the beam member being bridged by a diagonal element which extends upwardly and forwardly from the lower end of the beam member to intermediate the ends of the related arm and has a pivotal connection at its lower rear end with the beam member, and at its upper end is provided with a roller which engages with the under side of the related arm for movement lengthwise of the arm attendant to operation of a cable assembly which is connected to the diagonal element adjacent to its upper end, the cable being passed around sheaves and at a level so as not to interfere with the passage of crops through the harvester and connected to a common power source.

Another object of the invention is to provide a novel snubbing arrangement for controlling vertical swinging of the reel supports.

These and other objects of the invention will become more apparent from the specification and the drawings, wherein:

Figure 1 is a side elevational view of a portion of the support and a harvester incorporating the invention;

Figure 2 is a rear view of the harvester disassociated from its mobile support taken generally on line 2—2 of Figure 1, Figure 3 is an enlarged fragmentary sectional view taken substantially on the line 3—3 of Figure 1;

Figure 4 is a fragmentary plan view taken substantially on the line 4—4 of Figure 2; and Figure 5 is a perspective view of a harvester framework and illustrating an improved form of reel support.

Describing the invention in detail and referring to Figures 1–4 inclusive, the harvester incorporates an ambulatory wheeled structure generally designated 2 which comprises a framework 3 to which is connected a suspension system 5 which carries the harvester generally designated 6 and in the present instance is commonly known as a windrow harvester.

The harvester 6 incorporates a platform structure 7 which embodies a pair of end panels 8 and 9 which are suitably contoured at their forward ends to provide dividers 10 and 11, the side panels 8 and 9 being interconnected at their rear edges by an upright rear wall 12 which is reinforced along its upper and lower edges by means of longitudinal beam members 13 and 14, the beam member 13 extending the full length of the platform and the beam member 14 being disjointed intermediate the ends of the rear wall and terminating at opposite ends of a central discharge opening 16 which is formed in the rear wall of the panel 12 substantially centrally thereof for accommodating a windrow which is formed by grass or hay which is being cut by the sickle 18 on the forward edge of the platform and by that discharging from the lateral conveyors 19 and 20 which provide the bottom of the platform structure at opposite ends thereof. The entire platform is rigidified by means of uprights or beam members 21 and 22 which extend along the back wall 12 of the platform and connected at their upper ends with the beam member 13 and at their lower ends to the rear extremities of the fore and aft extending rigidifying beams 23 and 24, the platform being provided with other rigidifying fore and aft extending beams 25 and 26 which beams 23 through 26 connect at their forward ends with the rear bar portion 28 of the mower which at opposite ends is connected to the end panels 8 and 9 of the platform.

A harvesting reel generally designated 31 is supported above the platform and comprises a plurality of spiders 32 which carry bats 33 at their outer ends, the spiders being connected to a central shaft 34 which at opposite ends 35 and 36 extends outwardly of the end panels 8 and 9 and is thereat carried by means of support assemblies or linkages 37 and 38 respectively. It will be appreciated that these assemblies 37 and 38 are of identical construction and, therefore, only one need be described.

Each support assembly comprises a fore and aft extending arm 39 which has a forward end 40 embodying a bearing ensleeved about the adjacent end of the shaft in supporting relationship thereto. The arm 39 is bifurcated at its rear extremity to provide a pair of laterally spaced legs 41 and 42 which spread rearwardly and adjacent to their rear extremities are interconnected by brace member 43 and the rear ends 44 and 45 of the arm 39 are pivoted on generally horizontal axes by means of pins 46 and 47 respectively to a lug 48 on the rear channel member 13 and the upper end 50 of an upright beam 51 which is embodied as a structural part of an adjacent corner of the platform. It will be appreciated that the pins 46 and 47 of each arm assembly are coaxial. The beam member 51 is part of the frame structure of the platform and is provided adjacent to its lower end with a forwardly extending bracket 53 and is pivotally connected as by a pin 54 to the lower end 55 of a diagonally upwardly and forwardly extending support element 56 which is disposed in a hypotenusal relationship between the related arm 39 and the beam 51 and the element 56 is connected at its upper end 57 to a loop strap 58 which is looped over the adjacent arm 39, the bight 59 of the loop passing over the upper edge of the arm 39 and the side portions 60 and 61 straddling opposite sides of the arm and supporting a pin 62 beneath the arm in a substantially horizontal position and the pin serves as a journal for a roller 63 which engages with the lower edge 64 of the related arm and permits the member 56, which is disposed intermediate the ends of the arm 39 to move fore and aft along the arm attendant to pivoting at 54 in order to lower and raise the reel assembly 31.

The arm 56 is connected intermediate its ends as at 65 to one end of a cable 66 through a slack adjuster 67, the cable 66 having a fore and aft extending length 68 which extends rearwardly from the related arm 56 and passes around the back side of a sheave or pulley 69 at the adjacent corner and which is mounted for rotation by an upright pin 70 which is connected to the adjacent end of the top beam 13 of the rear panel structure 12. Each cable has a further length 71 which extends inwardly from the adjacent corner and passes under a sheave 72 disposed on the adjacent side by a piston and cylinder arrangement 73 which is located at one side with the opening 16. It will be appreciated that the cable lengths 71 are above the upper margin 74 of said opening 16 so as not to foul in the hay or crops. Each sheave 72 is supported by a standard 75 which is connected to the adjacent lower beam member 14. Each cable length 71 terminates in an inner end portion 76 which is connected as at 77 to a crosshead 78 connected to the upper end of a piston 79 which operates within a cylinder 80 which at its lower end is provided with a suitable hydraulic chamber into which fluid is parted through the conduit 81 to extend the piston 79 upwardly with attendant inward pull of the lengths 71 of the cable and rearward pull of the lengths 68 of the cable to effect upward swinging of the diagonal members 56 with resultant raising of the arms 39. It will be understood that release of the pressure in the cylinder 80 and the conduit 81 through manipulation of a conventional hydraulic control system, as will be readily seen by those skilled in the art, will effect a slackening in the cables and the weight of the reel 31 will cause the cables to be maintained taut with attendant downward and forward rotation of the support elements 56 and lowering of the reel.

It will be readily noted in a consideration of Figures 1 and 2 that drive to the reel is by pulley 83 which is keyed to one end of the shaft 34, the pulley having a belt trained thereon which is trained at its opposite end about a pulley 85 which is carried on and connected to a shaft 86 on an axis generally parallel to pins 47 and 46 and slightly rearwardly thereof and so positioned that a swinging of the arms 39, and arc of movement of the shaft 34 will fall within allowable slack in the belt 84 to maintain the drive. The shaft 86 is carried by suitable support on the platform and is driven by an operating or driving mechanism 89 which for the purposes of the present invention need not be further described.

Referring now to the embodiment of Figure 5, the platform generally designated 7a is essentially the same as the platform 7 in the previous embodiment and parts which correspond to those in the previous embodiment will be identified with the same reference numerals. In the present instance, the fore and aft extending end beam members 100 and 101 are shown and in lieu of the dividers of the previous embodiment the shoe structures 102 and 103 are utilized which include the curved shoe portions 104 and 105 and extend forwardly from the front beam structure 106 of the platform. The reel support assemblies 37a and 38a correspond to the assemblies 37 and 38 and the assemblies 37a and 38a are substantially identical in construction, therefore, only one of these needs to be specifically described. It will be noted that each assembly 37a and 38a includes the arm 39 which is mounted in the same manner at its inner extremity as in the previous embodiment, however, the reel supporting assemblies have their diagonal members 56a which correspond to the diagonal members 56 of the previous embodiment pivoted at their lower ends respectively as at 107 and 108 to the platform side beam members 100 and 101 adjacent to the lower ends of the beam 51. Essentially, the beam members 100 and 101 may be considered as extensions of the lugs 55 of the previous embodiment.

An additional feature of the instant embodiment over that previously described is in the provision of snubbing or yieldable control means 110 which comprises a tension spring 111 which at its lower end is hooked to a strap 112, the control assembly 110 at the right side of the harvester platform being connected by its strap 112 to the side beam member 100 and the assembly 110 at the left side of the machine being connected to the side beam member 101. The upper end of the spring 111 is hooked to a lug 113 which is connected to the upper end of the associated arm 56a. The function of the control assemblies 110 is to constantly maintain the cable assembly 68 in tension and to prevent the reel from continuously bouncing up and down with resultant wear upon the cable where it passes around the respective sheaves or where it is connected to the various parts.

In addition, in the present embodiment there are shown stops 115 which abut against the forward edges of the loops 58 to limit downward movement of the reel upon inactivation of the ram 79—80.

What is claimed is:

1. For a harvester reel positioned over a platform structure and having a shaft with opposite ends extending over opposite ends of the platform, a support for each end of the reel comprising a fore and aft extending arm having a forward end disposed in supporting relation to the related end of the shaft, structure including upright beams embodied in the ends of said platform and each having an upper end pivoted to the rear end of the adjacent arm, each beam having a lower end, a diagonal support element extending upwardly and forwardly from adjacent the lower end of each beam to intermediate the ends of the adjacent arm and having a lower end pivoted to said structure proximate the lower end of the related beam and having an upper end with a roller mounted thereon and supporting the arm for movement lengthwise thereof, each support element swingable upwardly rearwardly with attendant movement of its upper end toward the rear end of the related arm for lifting the latter and each support element swingable downwardly forwardly to lower the associated arm, and means connected to said element for swinging the same.

2. The combination according to claim 1 and snubbing means connected between an arm and said structure.

3. The invention according to claim 2 and said snubbing means comprising a tension spring disposed in opposition to said means.

4. The invention according to claim 1 and said last-mentioned means comprising an hydraulic piston and cylinder, said cylinder connected to said platform structure and said piston extending upwardly thereof and terminating in an upper end, a cross-head connected to said upper end of said piston, a pair of pulleys supported on generally horizontal axes from the platform at opposite sides of said piston at a level below its upper end in the telescoped position of said piston and cylinder, a pulley rotatably supported on generally vertical axis at each end of the platform rearwardly of said beams adjacent to the upper ends thereof, and a cable connected to each support element intermediate its ends and extending rearwardly therefrom and about the pulley at the adjacent end of the platform and trained under the pulley at that side of the piston and cylinder and connected to the adjacent end of said crosshead, said piston and cylinder operative in extension to pull said cables in directions swinging said support elements upwardly and in contraction to slack off on said cables whereby said support elements are urged to swing downwardly under the influence of the weight of said reel.

5. The invention according to claim 4 and snubbing means extending from adjacent the upper end of each arm to the structure therebelow and connected thereto for yieldably resisting upward movement of said arms.

6. For harvesters of the type having a platform structure above which is disposed a rotating reel having an axially outwardly extending shaft, a support for said reel comprising a fore and aft arm, means mounting said shaft on one end of said arm, side frames for said structure each including an upright beam connected to said structure and having an upper end pivoted to the opposite end of said arm on an axis generally parallel to said shaft, a diagonal support member extending between said side frame and said arm and pivotally connected at one end to said side frame at a point below said upper end of the beam and slidably and supportedly associated with said arm at its other end for movement lengthwise of said arm attendant to swinging movement of said member, and operating means for swinging said member connected thereto.

7. The invention according to claim 6 and means connected between said arm and said side frame for yieldably biasing said arm downwardly.

8. The invention according to claim 6 and said operating means comprising a piston and cylinder assembly connected at one end to said structure, a cable connected to said member at a point spaced from the point of pivot theerof and to the opposite end of said assembly and operative to move said member attendant to actuation of said assembly.

9. For harvesters of the type having a platform structure above which is disposed a rotating reel having an axially outwardly extending shaft, a support for the reel comprising a fore and aft arm member, means mounting the shaft on one end of said arm member, an upright beam member connected to said structure and having an upper end pivoted to the opposite end of said arm member, a diagonal element disposed in hypotenusal relationship to said members and having one end pivoted to one of said members at a point spaced from the point of pivot of said members to each other, and said element having a slidable connection with the other member for movement lengthwise thereof whereby swinging movement of said element toward said point of pivot between said members effects upward movement of the arm member with said reel and vice versa, and means operatively connected between said structure and said element for moving the latter.

10. For use with a harvester having a platform structure of the type terminating in opposite end walls and having a back wall defining opposite rear corners of the platform and having a rear crop discharge opening therethrough and a rotating reel positioned above the platform and having a shaft with opposite ends extending to adjacent said end walls, adjustable support means for positioning the reel vertically relative to said platform and comprising a triangular linkage disposed outwardly of each end wall and each comprising an upright element integrated into the adjacent corner of the platform, a fore and aft arm having a rear extremity pivoted to the upper end of the adjacent element and extending forwardly therefrom and having a forward end connected to the adjacent end of said shaft, and a diagonal member extending upwardly and forwardly from adjacent the lower end of the adjacent upright element to intermediate the ends of the associated arm, said diagonal member having a lower end pivoted proximate to the lower end of said element and having an upper end incorporating a loop sleeved about said arm, a roller carried by said loop beneath the arm in rolling contact therewith, a piston and cylinder assembly extending vertically behind said back wall at one side of said opening and having a lower end connected to said platform and having an upper end disposed in the telescoped position of said assembly above the level of the upper margin of said opening, a pair of sheaves rotatably carried by said platform at opposite sides of said assembly on force and aft axes and at a level above the upper margin of said opening, a pair of cables at opposite sides of said assembly having corresponding ends connected to the upper end of said assembly and passed under respective sheaves and extending away from said assembly toward respective corners, a sheave carried by said platform at each corner at a level above the upper margin of said opening on a generally vertical axis and having the adjacent cable trained about the back side thereof whereby each cable has a length extending between said assembly and the adjacent corner above the level of said opening, each cable having a length extending from the related corner sheave to intermediate the ends of the adjacent diagonal member.

No references cited.